US012650990B2

(12) United States Patent
Cho et al.

(10) Patent No.: US 12,650,990 B2
(45) Date of Patent: Jun. 9, 2026

(54) PARTITION HANDLING FOR MULTI TABLE SCAN SEMI JOIN OPERATIONS

(71) Applicant: SAP SE, Walldorf (DE)

(72) Inventors: Sukhyeun Cho, Incheon (KR); Sumin Ko, Incheon (KR)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/932,456

(22) Filed: Oct. 30, 2024

(65) Prior Publication Data

US 2026/0119504 A1     Apr. 30, 2026

(51) Int. Cl.
*G06F 16/2455* (2019.01)
*G06F 16/22* (2019.01)

(52) U.S. Cl.
CPC ...... *G06F 16/2456* (2019.01); *G06F 16/2282* (2019.01)

(58) Field of Classification Search
CPC .................................................. G06F 16/2456
USPC ........................................................ 707/737
See application file for complete search history.

(56) References Cited

U.S. PATENT DOCUMENTS

| | | | | |
|---|---|---|---|---|
| 2006/0218123 A1* | 9/2006 | Chowdhuri | ....... | G06F 16/24532 |
| 2007/0027860 A1* | 2/2007 | Bestgen | ............ | G06F 16/24544 |
| | | | | 707/999.005 |
| 2019/0311058 A1* | 10/2019 | Corradi | .............. | G06F 16/2282 |
| 2022/0245150 A1* | 8/2022 | Delbru | .............. | G06F 16/24544 |

* cited by examiner

*Primary Examiner* — Muluemebet Gurmu
(74) *Attorney, Agent, or Firm* — Mintz Levin Cohn Ferris Glovsky and Popeo, P.C.

(57) ABSTRACT

Arrangements for partition handling for multi table scan semi join operations are provided. Partition information of a first logical relation may be determined. Partition information of a first physical operator may be determined based on the partition information of the first logical relation. The partition information of the first physical operator may be stored in a data structure which includes partition information of a fact table and of each reducer in a predefined sequence. Partition information of a second logical relation may be determined. The partition information of a second physical operator may be determined based on the partition information of the second logical relation and the partition information of the first physical operator. The partition information of the second physical operator may be stored in the data structure. Execution of the second physical operator may be performed using the stored partition information, skipping mappings between pairs of partitions.

20 Claims, 7 Drawing Sheets

400

INPUT/OUTPUT
DEVICES
440

STORAGE DEVICE
430

MEMORY
420

PROCESSOR
410

BUS
450

FIG. 4

PARTITION HANDLING FOR MULTI TABLE SCAN SEMI JOIN OPERATIONS

TECHNICAL FIELD

The subject matter described herein relates generally to data processing and, in particular, to partition handling for multi table scan semi join operations.

BACKGROUND

Partition handling becomes complex due to Multi Table Scan Semi Join operations. Its logical relation is a semi join type, but its physical operator, Table Scan Semi Join, must carry all partition information from a target as well as reducers. A method to handle the scenario is not available.

SUMMARY

Methods, systems, and articles of manufacture, including computer program products, are provided for partition handling for multi table scan semi join operations are implemented. In one aspect, a computer-implemented method includes identifying a fact table divided into a plurality of partitions based on values of partition conditions; identifying multiple reducers, each reducer divided into a plurality of partitions based on the partition conditions; determining partition information of a first logical relation based on partition information of its child nodes; determining partition information of a first physical operator on the first logical relation based on the partition information of the first logical relation; storing the partition information of the first physical operator in a new data structure, wherein the new data structure stores partition information of the fact table and partition information of each reducer in a predefined sequence; determining partition information of a second logical relation based on partition information of its child nodes; determining the partition information of a second physical operator on the second logical relation based on the partition information of the second logical relation and the partition information of the first physical operator; storing the partition information of the second physical operator in the new data structure; and performing execution of the second physical operator using the partition information stored in the new data structure, wherein the execution skips mappings between pairs of partitions.

In some variations one or more of the following can optionally be included. the new data structure comprises a first variable in format of a vector and a second variable in the format of a list of vectors. Storing the partition information of each reducer in the predefined sequence includes inserting the partition information of each reducer into a list following an order of child reducers of a table scan semi join operator. The partition information is created by a user generating the fact table. The first logical relation is a semi-join operator in relational algebra that selects tuples from one relation that matches tuples in another relation. The second logical relation is a semi-join operator and an ancestor of the first logical relation. The first physical operator is a table scan semi join operator that performs optimized join operations between to tables of different sizes.

Articles are also described that comprise a tangibly embodied machine-readable medium operable to cause one or more machines (e.g., computers, etc.) to result in operations described herein. Similarly, computer systems are also described that may include a processor and a memory coupled to the processor. The memory may include one or more programs that cause the processor to perform one or more of the operations described herein. The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 4 depicts a block diagram illustrating a computing system, in accordance with some example embodiments.

When practical, similar reference numbers denote similar structures, features, or elements.

DETAILED DESCRIPTION

Aspects of the disclosure provide a technical solution that addresses problems associated with the partition handling for multi table scan semi join operations. For example, as discussed in further detail below, aspects of the disclosure provide partition optimization on Multi Scan Semi Join operations that lead to a reduction of execution time.

Multi Table Scan Semi Join is an extension of Table Scan Semi Join. Table Scan Semi Join converts a join condition of a semi-join into an in-list of a fact table (e.g., a large table), and data from a large table may be filtered with the in-list from the join condition of the semi-join. However, although there are multiple semi-joins sharing a common fact table, traditional methods could not produce Table Scan Semi Join for multiple semi-joins. That is, previous optimizers could not handle partitioned Multi Table Scan Semi Join which needs to calculate partition mappings between its fact table and multiple reducers instead of using partition mappings of its logical relation. The Multi Table Scan Semi Join feature enables applying Table Scan Semi Join algorithm on multiple semi-joins sharing a common fact table.

Mapping partition information involves storing information from left and right child nodes and then mapping them accordingly. However, this mapping becomes complex with respect to Table Scan Semi Join, which must carry all partition information from its target as well as reducers. To address the partitioned input for Multi Table Scan Semi Join, a new data structure MultiJoinPartitionExec (e.g., Multi Join Partition Execution), is assigned to the physical operator. This structure stores the partitions from the target and the ones from the reducers in sequence (complying with each reducer's absorption order) within a vector.

In specific situations where it is necessary to match the partition information from the target and a reducer (partition information of a semi-join), the order of the reducer is calculated. Subsequently, the partitions from the target become the left child partition and those from the reducer with the chosen index become the right child partition. To efficiently manage memory under these circumstances, a data structure that holds references to an already-allocated vector of MultiJoinPartitionExec is also implemented.

Figure 1:
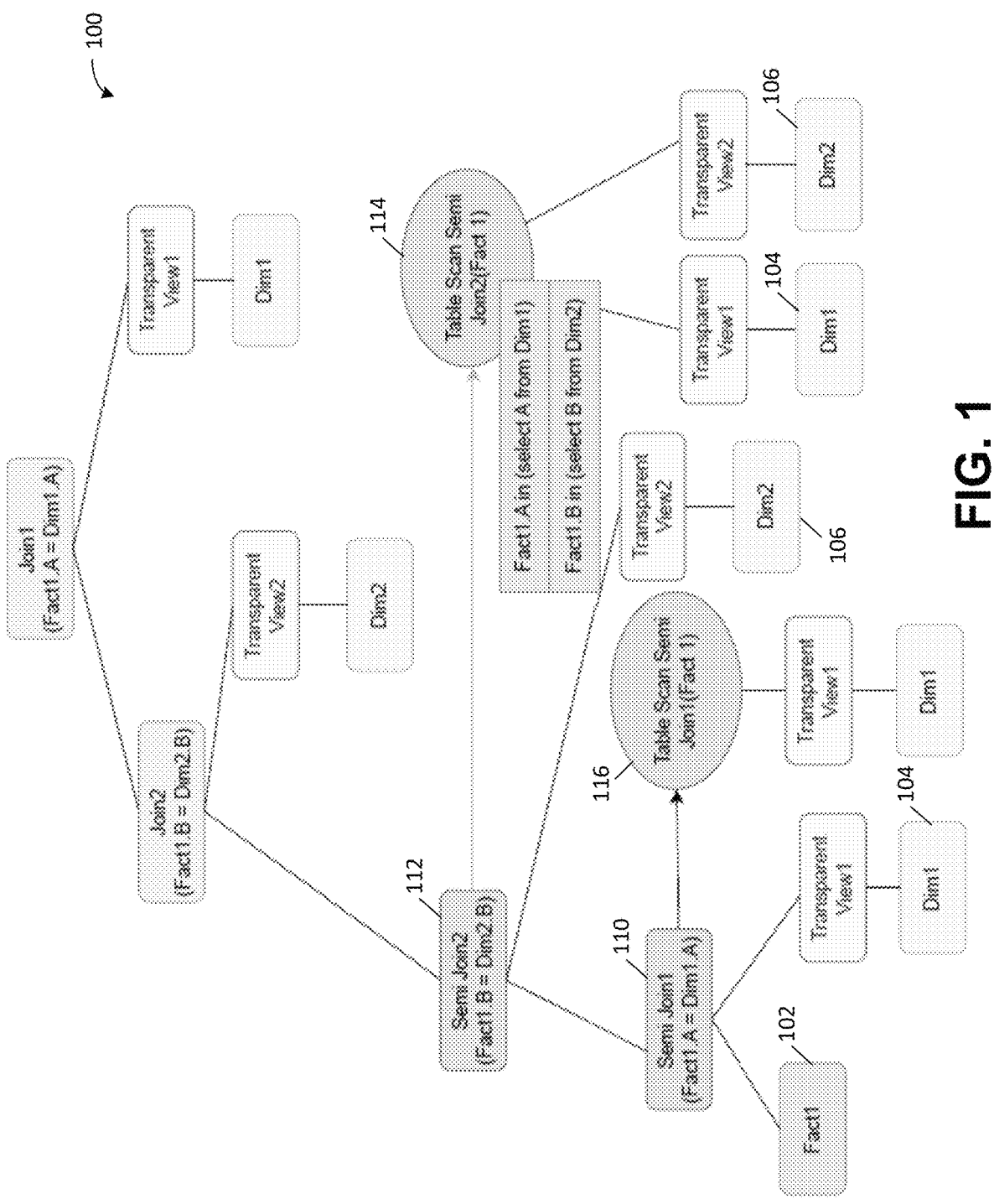
FIG. 1 depicts a graph illustrating a tree structure used in partition handling for multi table scan semi join operations in accordance with some example embodiments.

FIG. 1 depicts a graph illustrating a tree structure 100 used in partition handling for multi table scan semi join operations in accordance with some example embodiments. As shown in FIG. 1, Fact1 102 may be a fact table including a large amount of data, Dim1 104 and Dim2 106 (e.g., dimension tables used to reduce the size of the fact table) may be attribute tables with much less data. There are two semi-joins (e.g., Semi Join1 110 and SemiJoin2 112) over Fact1, Dim1, and Dim2. Table Scan Semi Join2 112 is enumerated with multiple child nodes for Semi Join2 112. Assuming Fact 1, Dim1, and Dim2 are partitioned, in the previous optimizer, there was no appropriate way to handle partition information for Multi Table Scan Semi Join which absorbs a fact table (e.g., Fact1 102) and two other semi joins (e.g., Semi Join1 110 and SemiJoin2 112) and holds two children (e.g., Dim1 104 and Dim2 106) from the right child of each semi-join (e.g., Semi Join1 110 and SemiJoin2 112). When Fact1, Dim1, and Dim2 are partitioned, aspects of the disclosure can skip mappings (e.g., unnecessary or irrelevant mappings) using this partition information. However, there is currently no way to store the information for the nodes Fact1 102, Dim1 104, and Dim2 106 for Table Scan SemiJoin2 114.

Figure 2:
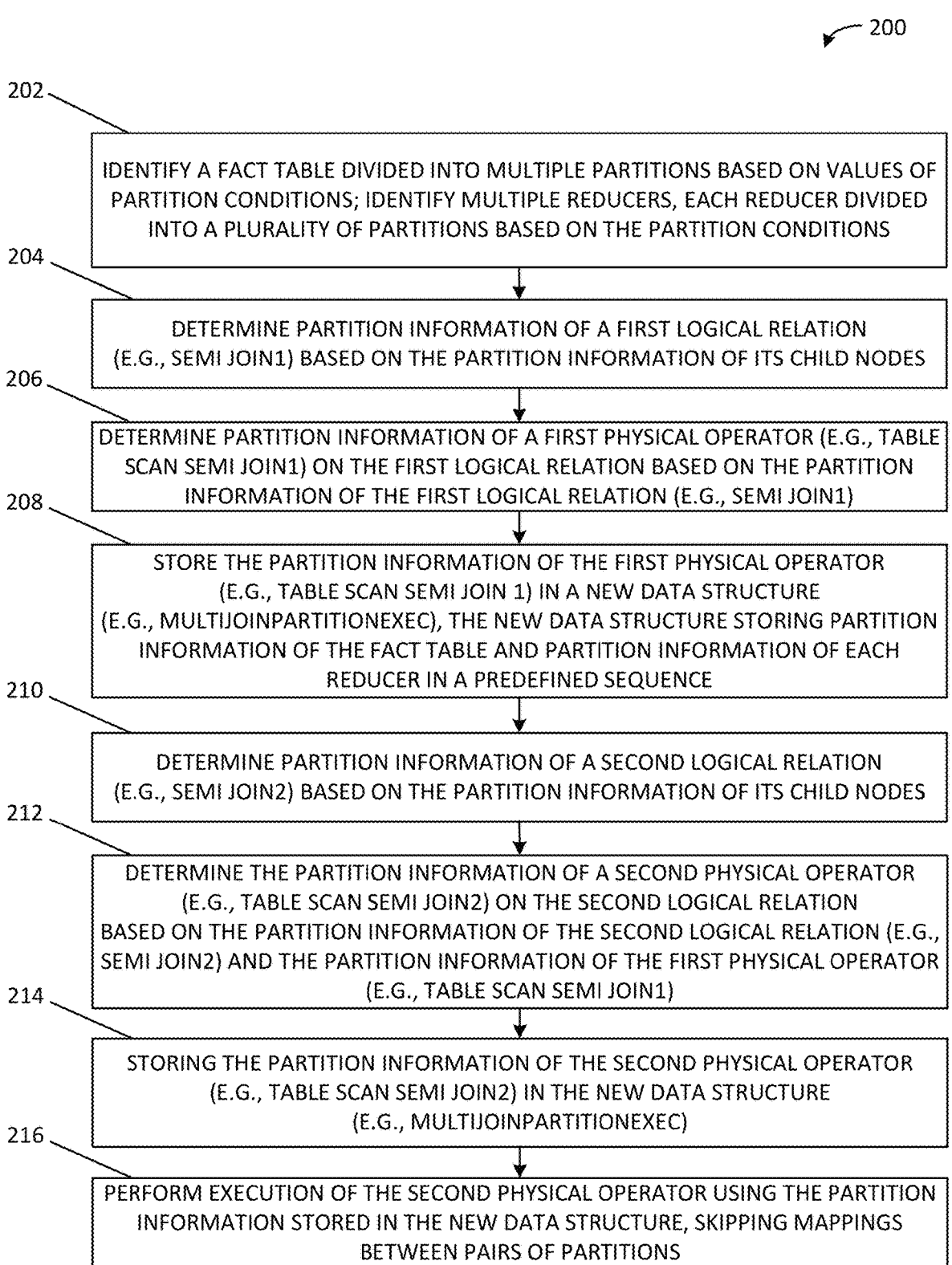
FIG. 2 depicts a flowchart illustrating a process for implementing partition handling for multi table scan semi join operations in accordance with some example embodiments.

FIG. 2 depicts a flowchart 200 illustrating a process for implementing partition handling for multi table scan semi join operations in accordance with some example embodiments. FIGS. 3A-3D depict partition information and a new data structure used in partition handling for multi table scan semi join operations in accordance with some example embodiments. FIGS. 2 and 3A-3D will be discussed together.

Referring to FIG. 2, at step 202, a computing platform may identify a fact table divided into a plurality of partitions based on values of partition conditions. In addition, the computing platform may identify multiple reducers, each reducer divided into a plurality of partitions based on the partition conditions. For example, Fact1 102 may be divided into four partitions 120, Dim1 104 may be divided into two partitions 130 and Dim2 106 may be divided into two partitions 145. The partition information of logical relation Semi Join1 110 is calculated based on the partition information of its child nodes (i.e., Fact1 102 and Dim1 104). In some examples, partition information may be created by a user generating the fact table (e.g., in structured query language: CREATE Fact1 (A int, B int . . . ) PARTITION BY A (values <=0, values >0)).

Figure 3A:
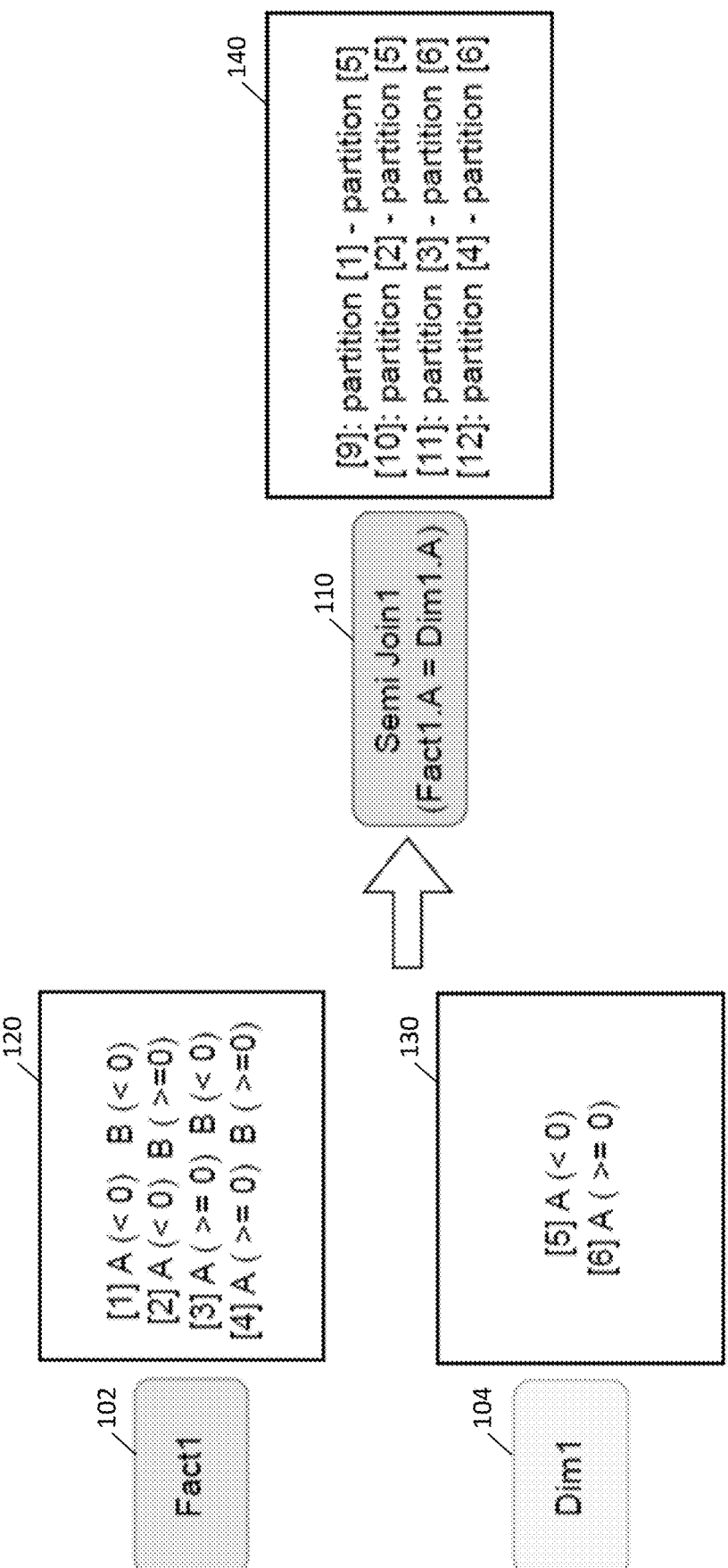
FIG. 3A depicts partition information used in partition handling for multi table scan semi join operations in accordance with some example embodiments.

At step 204, a computing platform may determine (e.g., calculate) partition information of a first logical relation (e.g., Semi Join1) based on partition information of its child nodes and its join condition. Referring to FIG. 3A, the left child node Fact1 120 has four partitions as shown at 120, and the right child node Dim1 104 has two partitions as shown at 130. The join condition Semi Join1 110 is related to field "A" of Fact1 and field "A" of Dim1. Semi Join1 110 determines data holding the same value between Fact1.A and Dim1.A. As shown in partition information 140 of Semi Join1 in FIG. 3A, partition [1] of Fact1 maps to partition [5] of Dim1; partition [2] of Fact1 maps to partition [5] of Dim1, partition [3] of Fact1 maps to partition [6] of Dim1, and partition [4] of Fact1 maps to partition [6] of Dim1. The newly created partition mapping will hold a new unique ID/identifiers (e.g., [9], [10], [11], and [12]).

Returning to FIG. 2, at step 206, a computing platform may determine (e.g., calculate) partition information of a first physical operator (e.g., Table Scan Semi Join1) on the first logical relation (e.g., Semi Join1) based on the partition information of the first logical relation (e.g., of Semi Join1). At step 208, the computing platform may store the partition information of the first physical operator (e.g., of Table Scan Semi Join 1) in a new data structure. The new data structure stores partition information of the fact table and partition information of each reducer in a predefined sequence. The physical operator may include a Table Scan Semi Join operator that performs optimized join operation between tables of different sizes. For example, the Table Scan Semi Join operator performs optimized join operations between a small table and a large table. A relatively small list of values is provided and used to prefilter the rows in the large table to reduce output rows. For example, the partition information 150 of the physical operator Table Scan Semi Join1 116 for the first logical relation Semi Join1 110 may be calculated based on the partition information 140 of Semi Join1 110, which is stored in a new data structure (e.g., Multi-JoinPartitionExec 115 in FIG. 3B). As shown in partition information 150 (MultiJoinPartitionExec) is created for each partition 140 of Semi Join1. The new data structure may contain two variables: a table variable (e.g., in the format of a vector or a list) which holds the partition information (e.g., partition number) of a fact table (e.g., Fact1), and a join children ("joinChildren") variable (e.g., in the format of a vector of vectors or a list of vectors) which holds the partition information of every reducer (e.g., Dim1 and Dim2) in sequence (e.g., in the same order of each child node; if the children of Table Scan Semi Join2 114 is in the order of Dim1 and Dim2, the partition information of each reducer is stored in the join children list in the same order). That is, the partition information of each reducer is inserted into the join children list following the order of the child reducers of a Table Scan Semi Join. This assists in mapping the partition information of Fact1 and Dim1, and Fact 1 and Dim2, etc. when Table Scan Semi Join2 is executed during runtime.

Figure 3B:
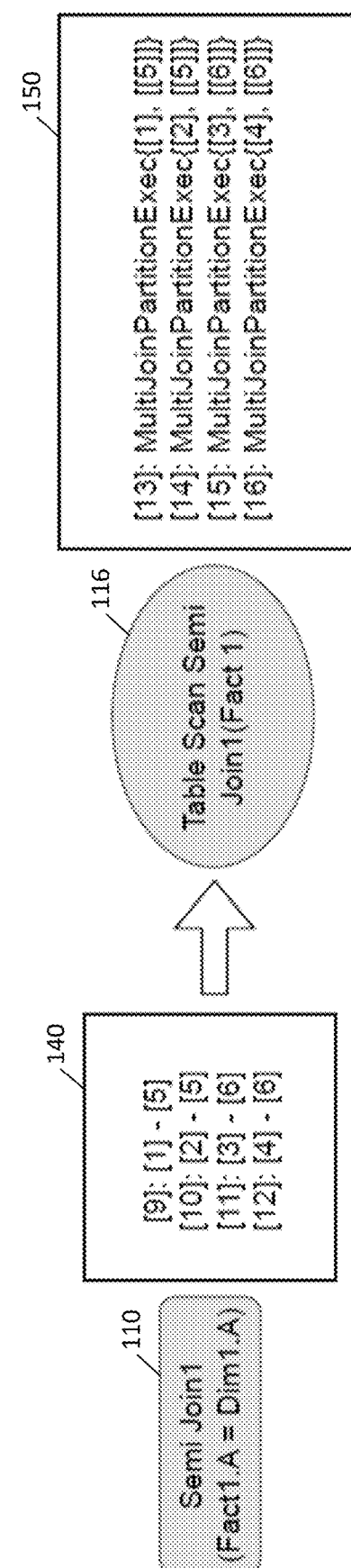
FIG. 3B depicts partition information and a new data structure used in partition handling for multi table scan semi join operations in accordance with some example embodiments.

As Table Scan Semi Join1 110 holds only one reducer child, the partition information calculation involves copying the information on the left side of the partition information of Semi Join1 into table variable of MultiJoinPartitionExec and the information on the right side into the first element of join children list of the joinChildren variable (e.g., as shown in 150 in FIG. 3B).

Figure 3C:
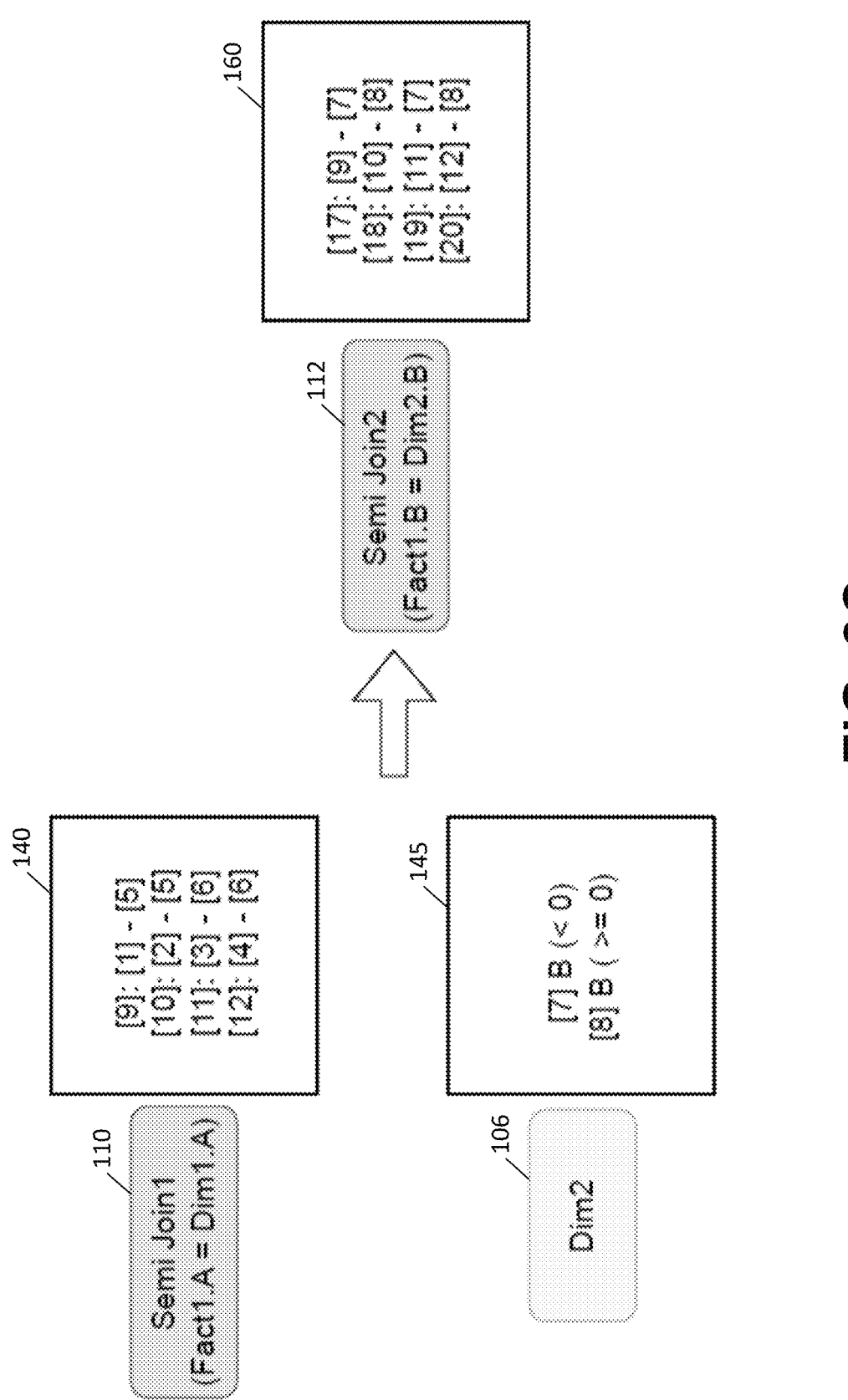
FIG. 3C depicts partition information used in partition handling for multi table scan semi join operations in accordance with some example embodiments.

At step 210, the computing platform may determine (e.g., calculate) partition information of a second logical relation (e.g., Semi Join2) based on partition information of its child nodes and its join condition. The second logical relation may be a semi-join operator (Semi Join2 112), which is an ancestor of the first logical relation (Semi Join1 110). For example, the partition information 160 of SemiJoin2 may be calculated based on the partition information 140 of Semi Join1 and the partition information of Dim2 106. As illustrated in FIG. 3C, the join condition of Semi Join2 112 is related to the field "B" of Fact1 102 and Dim2 106. Considering the range condition of each partition from related field "B" in 120, partition item [1] holds "B" which is less than or equal to zero, therefore, in partition information 160 of Semi Join2, partition [9] maps to partition [7]. Partition item holds "B" which is greater than zero, therefore, in partition information 160 of Semi Join2, partition [10] maps to partition [8]. In a similar manner, partition maps to partition [7], and partition maps to partition [8]. The resulting partition mappings of Semi Join2 are illustrated in 160.

At step 212, the computing platform may determine (e.g., calculate) the partition information of a second physical operator (e.g., Table Scan Semi Join2) on the second logical relation (e.g., Semi Join2) based on the partition information of the second logical relation (e.g., of Semi Join2) and the partition information of the first physical operator (e.g., of Table Scan Semi Join1). At step 214, the computing platform may store the partition information of the second physical operator (e.g., of Table Scan Semi Join2) in the new data structure. As discussed above, the new data structure stores partition information of the fact table and partition information of each reducer in a predefined sequence.

At step 216, the computing platform may perform execution of the second physical operator (e.g., Table Scan Semi Join2) using the partition information stored in the new data structure (e.g., MultiJoinPartitionExec). As discussed further herein, the execution skips mappings (e.g., unnecessary or irrelevant mappings) between pairs of partitions.

For Table Scan Semi Join2 114, which is the alternative of Semi Join2 112, the partition information of the second physical operator is Table Scan Semi Join2 114 is calculated based on the partition information 160 of Semi Join2 112 (its logical relation). In addition, the partition information 150 of Table Scan Semi Join1 116 will reference information from Fact1 102, Semi Join1 110, and Semi Join2 112.

Figure 3D:
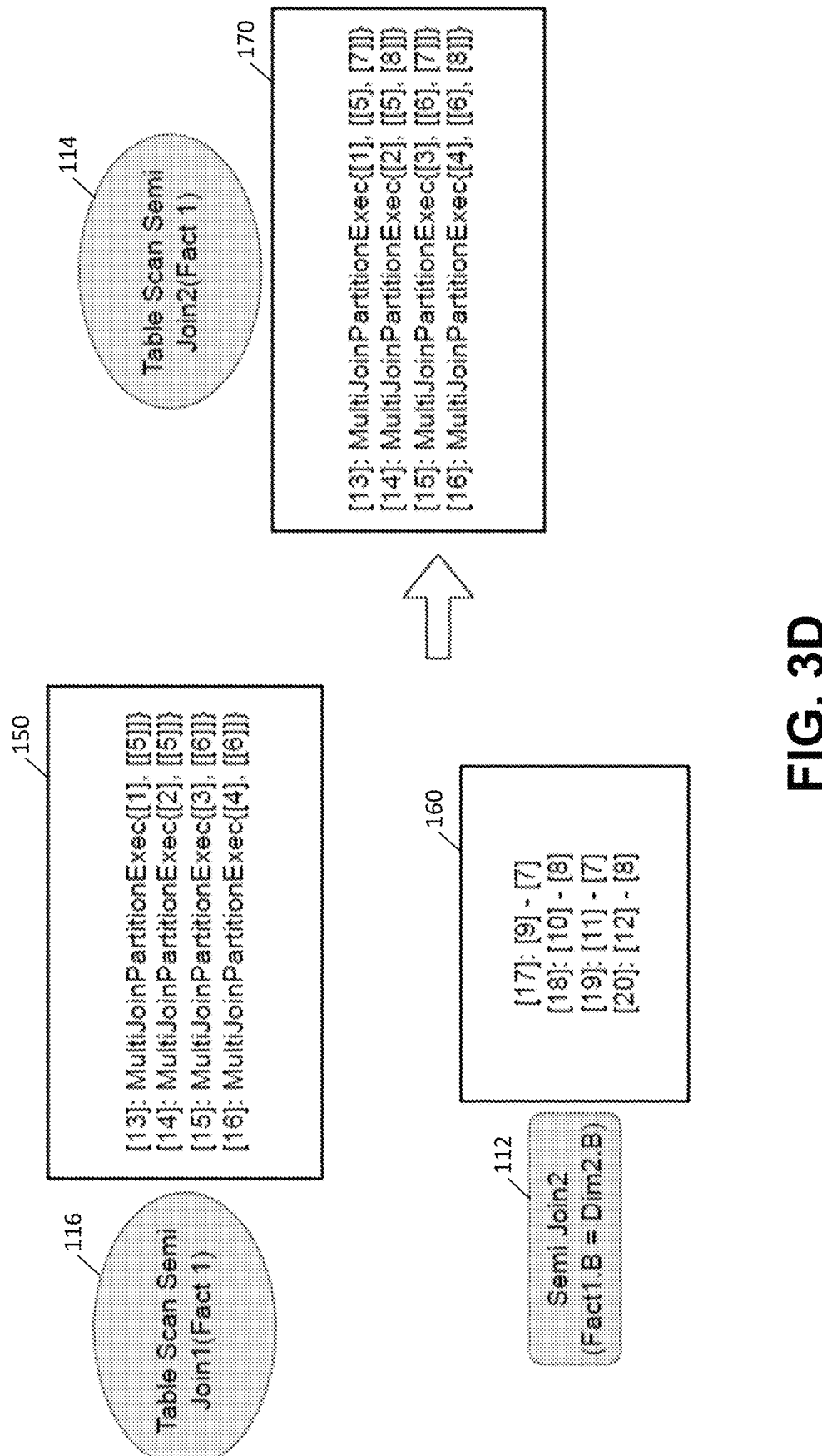
FIG. 3D depicts partition information used in partition handling for multi table scan semi join operations in accordance with some example embodiments.

Referring to FIG. 3D, the partition information 170 of this newly created operator Table Scan Semi Join2 114 is stored in the format of MultiJoinPartitionExec. First partition information 150 of Table Scan Semi Join1 is copied. Then, the right side of the partition mappings 160 of Semi Join2, holds information from each right child (Dim2 106), is inserted into the join children list as the second element of each joinChildren variable (e.g., [7], [8], [7], [8] are inserted into the join children list in 170. During execution, these join conditions may be converted into the in-lists for the fact table (Fact1) for the Table Scan Semi Join2 operator. When executing the first in-list from Semi Join1 110, the table variable (i.e., [1], [2], [3], [4]) and the first element of the joinChildren variable (i.e., [5], [5], [6], [6]) of MultiJoinPartitionExec may be referenced from partition information 170 in FIG. 3D. When executing the first in-list from Semi Join2 112, the table variable (i.e., [1], [2], [3], [4]) and the second element of the joinChildren variable (i.e., [7], [8], [7], [8]) of MultiJoinPartitionExec may be referenced from partition information 170 in FIG. 3D. Thus, mappings (e.g., between partition [1] and partition [6], between partition [2] and partition [7], etc., that have different range conditions) may be skipped. Execution time may be accelerated when executing the operator (e.g., Table Scan Semi Join2).

For example, with Table Scan Semi Join2 114, it may be determined that partition [1] from the fact table will be only mapped to partition [5] of the first child (Dim1) and partition [7] of the second child (Dim2). Therefore, when handling the in-lists on the fact table, for rows in partition [1], aspects of the disclosure can skip checking of the values from partition [6] or partition [8], which leads to better performance.

In summary, the physical algorithm for each logical relation is chosen from bottom to top. Initially, Table Scan Semi Join1 116 will be enumerated for Semi Join1 110. Then, the bigger tree containing Semi Join2 is considered. Table Scan Semi Join2 114 is enumerated for the top join in the sub tree, i.e., Semi Join2 112. Further physical algorithms will be enumerated repeatedly for ancestors of Semi Join2 112 until the root operator is reached.

Figure 4:
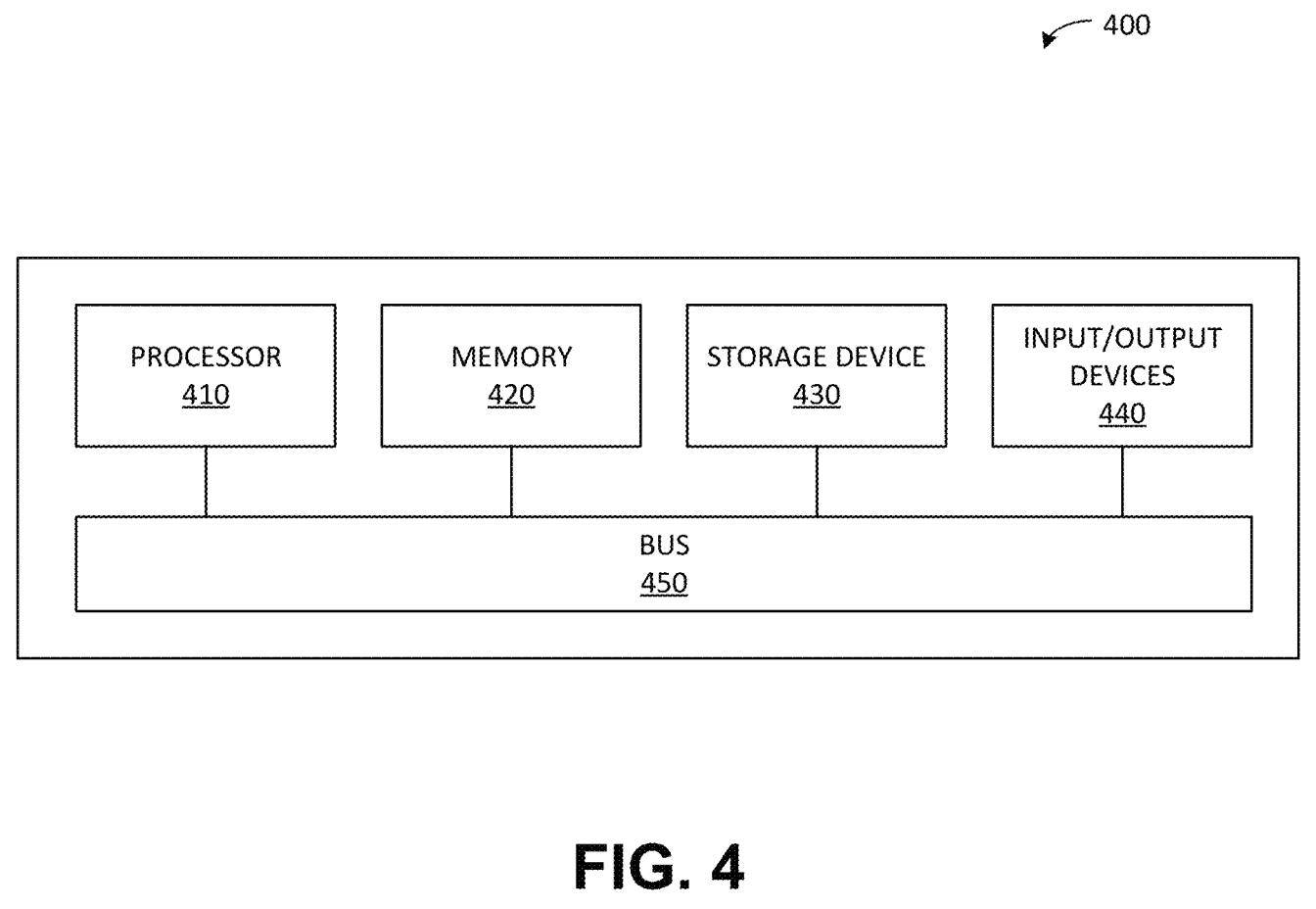

FIG. 4 depicts a block diagram illustrating a computing system 400 consistent with implementations of the current subject matter. Referring to FIGS. 1-4, the computing system 400 can be used to implement partition handling for multi table scan semi join operations 200 and/or any components therein.

As shown in FIG. 4, the computing system 400 can include a processor 410, a memory 420, a storage device 430, and input/output devices 440. The processor 410, the memory 420, the storage device 430, and the input/output devices 440 can be interconnected via a system bus 450. The processor 410 is capable of processing instructions for execution within the computing system 400. Such executed instructions can implement one or more components of, for example, partition handling for multi table scan semi join operations 200. In some implementations of the current subject matter, the processor 410 can be a single-threaded processor. Alternately, the processor 410 can be a multi-threaded processor. The processor 410 is capable of processing instructions stored in the memory 420 and/or on the storage device 430 to display graphical information for a user interface provided via the input/output device 440.

The memory 420 is a computer readable medium such as volatile or non-volatile that stores information within the computing system 400. The memory 420 can store data structures representing configuration object databases, for example. The storage device 430 is capable of providing persistent storage for the computing system 400. The storage device 430 can be a solid-state device, a floppy disk device, a hard disk device, an optical disk device, a tape device, and/or any other suitable persistent storage means. The input/output device 440 provides input/output operations for the computing system 400. In some implementations of the current subject matter, the input/output device 440 includes a keyboard and/or pointing device. In various implementations, the input/output device 440 includes a display unit for displaying graphical user interfaces.

According to some implementations of the current subject matter, the input/output device 440 can provide input/output operations for a network device. For example, the input/output device 440 can include Ethernet ports or other networking ports to communicate with one or more wired and/or wireless networks (e.g., a local area network (LAN), a wide area network (WAN), the Internet).

In some implementations of the current subject matter, the computing system 400 can be used to execute various interactive computer software applications that can be used for organization, analysis and/or storage of data in various (e.g., tabular) format (e.g., Microsoft Excel®, and/or any other type of software). Alternatively, the computing system 400 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning add-in for Microsoft Excel as part of the SAP Business Suite, as provided by SAP SE, Walldorf, Germany) or can be stand-alone computing products and/or functionalities. Upon activation within the applications, the functionalities can be used to generate the user interface provided via the input/output device 440. The user interface can be generated and presented to a user by the computing system 400 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A computer-implemented method comprising:

identifying a fact table divided into a plurality of partitions based on values of partition conditions;

identifying multiple reducers, each reducer divided into a plurality of partitions based on the partition conditions;

determining partition information of a first logical relation based on partition information of its child nodes;

determining partition information of a first physical operator on the first logical relation based on the partition information of the first logical relation;

storing the partition information of the first physical operator in a new data structure, wherein the new data structure stores partition information of the fact table and partition information of each reducer in a predefined sequence;

determining partition information of a second logical relation based on partition information of its child nodes;

determining the partition information of a second physical operator on the second logical relation based on the partition information of the second logical relation and the partition information of the first physical operator;

storing the partition information of the second physical operator in the new data structure; and performing execution of the second physical operator using the partition information stored in the new data structure, wherein the execution skips mappings between pairs of partitions.

Example 2: The computer-implemented method of Example 1, wherein the new data structure comprises a first variable in format of a vector and a second variable in the format of a list of vectors.

Example 3: The computer-implemented method of any of Examples 1-2, wherein storing the partition information of each reducer in the predefined sequence comprises inserting the partition information of each reducer into a list following an order of child reducers of a table scan semi join operator.

Example 4: The computer-implemented method of any of Examples 1-3, wherein the partition information is created by a user generating the fact table.

Example 5: The computer-implemented of any of Examples 1-4, wherein the first logical relation is a semi-join operator in relational algebra that selects tuples from one relation that matches tuples in another relation.

Example 6: The computer-implemented of any of Examples 1-5, wherein the second logical relation is a semi-join operator and an ancestor of the first logical relation.

Example 7: The computer-implemented of any of Examples 1-6, wherein the first physical operator is a table scan semi join operator that performs optimized join operations between to tables of different sizes.

Example 8: A system comprising:

at least one processor; and at least one memory including program code which when executed causes the system to provide operations comprising:

identifying a fact table divided into a plurality of partitions based on values of partition conditions;

identifying multiple reducers, each reducer divided into a plurality of partitions based on the partition conditions;

determining partition information of a first logical relation based on partition information of its child nodes;

determining partition information of a first physical operator on the first logical relation based on the partition information of the first logical relation;

storing the partition information of the first physical operator in a new data structure, wherein the new data structure stores partition information of the fact table and partition information of each reducer in a predefined sequence;

determining partition information of a second logical relation based on partition information of its child nodes;

determining the partition information of a second physical operator on the second logical relation based on the partition information of the second logical relation and the partition information of the first physical operator;

storing the partition information of the second physical operator in the new data structure; and performing execution of the second physical operator using the partition information stored in the new data structure, wherein the execution skips mappings between pairs of partitions.

Example 9: The system of Example 8, wherein the new data structure comprises a first variable in format of a vector and a second variable in the format of a list of vectors.

Example 10: The system of any of Examples 8-9, wherein storing the partition information of each reducer in the predefined sequence comprises inserting the partition information of each reducer into a list following an order of child reducers of a table scan semi join operator.

Example 11: The system of any of Examples 8-10, wherein the partition information is created by a user generating the fact table.

Example 12: The system of any of Examples 8-11, wherein the first logical relation is a semi-join operator in relational algebra that selects tuples from one relation that matches tuples in another relation.

Example 13: The system of any of Examples 8-12, wherein the second logical relation is a semi-join operator and an ancestor of the first logical relation.

Example 14: The system of any of Examples 8-13, wherein the first physical operator is a table scan semi join operator that performs optimized join operations between to tables of different sizes.

Example 15: A non-transitory computer-readable storage medium including program code which when executed by at least one processor causes operations comprising: identifying a fact table divided into a plurality of partitions based on values of partition conditions;

identifying multiple reducers, each reducer divided into a plurality of partitions based on the partition conditions;

determining partition information of a first logical relation based on partition information of its child nodes;

determining partition information of a first physical operator on the first logical relation based on the partition information of the first logical relation;

storing the partition information of the first physical operator in a new data structure, wherein the new data structure stores partition information of the fact table and partition information of each reducer in a predefined sequence;

determining partition information of a second logical relation based on partition information of its child nodes;

determining the partition information of a second physical operator on the second logical relation based on the partition information of the second logical relation and the partition information of the first physical operator;

storing the partition information of the second physical operator in the new data structure; and performing execution of the second physical operator using the partition information stored in the new data structure, wherein the execution skips mappings between pairs of partitions.

Example 16: The non-transitory computer-readable storage medium of Example 15, wherein the new data structure comprises a first variable in format of a vector and a second variable in the format of a list of vectors.

Example 17: The non-transitory computer-readable storage medium of Example 15-16, wherein storing the partition information of each reducer in the predefined sequence comprises inserting the partition information of each reducer into a list following an order of child reducers of a table scan semi join operator.

Example 18: The non-transitory computer-readable storage medium of Example 15-17, wherein the partition information is created by a user generating the fact table.

Example 19: The non-transitory computer-readable storage medium of Example 15-18, wherein the first logical relation is a semi-join operator in relational algebra that selects tuples from one relation that matches tuples in another relation.

Example 20: The non-transitory computer-readable storage medium of Example 15-19, wherein the second logical relation is a semi-join operator and an ancestor of the first logical relation.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A computer-implemented method comprising:
identifying a fact table divided into a plurality of partitions based on values of partition conditions;
identifying multiple reducers comprising at least a first reducer and a second reducer, each reducer divided into a plurality of partitions based on the partition conditions;
determining partition information of a first logical relation based on partition information of its child nodes comprising at least the fact table and the first reducer;
determining partition information of a first physical operator on the first logical relation based on the partition information of the first logical relation;
storing the partition information of the first physical operator in a new data structure, wherein the new data structure stores partition information of the fact table and partition information of each reducer in a predefined sequence;
determining partition information of a second logical relation based on partition information of its child nodes;
determining the partition information of a second physical operator on the second logical relation based on the partition information of the second logical relation and the partition information of the first physical operator;
storing the partition information of the second physical operator in the new data structure; and
performing execution of the second physical operator using the partition information stored in the new data structure, wherein the execution skips mappings between pairs of partitions.

2. The computer-implemented method of claim 1, wherein the new data structure comprises a table variable which holds partition information of the fact table and a join children variable which holds partition information of each of the multiple reducers in sequence.

3. The computer-implemented method of claim 1, wherein storing the partition information of each reducer in the predefined sequence comprises inserting the partition information of each reducer into a list following an order of child reducers of a table scan semi join operator.

4. The computer-implemented method of claim 1, wherein the partition information is created by a user generating the fact table.

5. The computer-implemented method of claim 1, wherein the first logical relation is a semi-join operator in relational algebra that selects tuples from one relation that matches tuples in another relation.

6. The computer-implemented method of claim 1, wherein the second logical relation is a semi-join operator and an ancestor of the first logical relation.

7. The computer-implemented method of claim 1, wherein the first physical operator is a table scan semi join operator that performs optimized join operations between two tables of different sizes.

8. A system comprising:
at least one processor; and
at least one memory including program code which when executed causes the system to provide operations comprising:
identifying a fact table divided into a plurality of partitions based on values of partition conditions;
identifying multiple reducers comprising at least a first reducer and a second reducer, each reducer divided into a plurality of partitions based on the partition conditions;
determining partition information of a first logical relation based on partition information of its child nodes comprising at least the fact table and the first reducer;
determining partition information of a first physical operator on the first logical relation based on the partition information of the first logical relation;
storing the partition information of the first physical operator in a new data structure, wherein the new data structure stores partition information of the fact table and partition information of each reducer in a predefined sequence;
determining partition information of a second logical relation based on partition information of its child nodes;
determining the partition information of a second physical operator on the second logical relation based on the partition information of the second logical relation and the partition information of the first physical operator;
storing the partition information of the second physical operator in the new data structure; and
performing execution of the second physical operator using the partition information stored in the new data structure, wherein the execution skips mappings between pairs of partitions.

9. The system of claim 8, wherein the new data structure comprises a first variable in format of a vector and a second variable in the format of a list of vectors.

10. The system of claim 8, wherein storing the partition information of each reducer in the predefined sequence comprises inserting the partition information of each reducer into a list following an order of child reducers of a table scan semi join operator.

11. The system of claim 8, wherein the partition information is created by a user generating the fact table.

12. The system of claim 8, wherein the first logical relation is a semi-join operator in relational algebra that selects tuples from one relation that matches tuples in another relation.

13. The system of claim 8, wherein the second logical relation is a semi-join operator and an ancestor of the first logical relation.

14. The system of claim 8, wherein the first physical operator is a table scan semi join operator that performs optimized join operations between two tables of different sizes.

15. A non-transitory computer-readable storage medium including program code which when executed by at least one processor causes operations comprising:

identifying a fact table divided into a plurality of partitions based on values of partition conditions;

identifying multiple reducers comprising at least a first reducer and a second reducer, each reducer divided into a plurality of partitions based on the partition conditions;

determining partition information of a first logical relation based on partition information of its child nodes comprising at least the fact table and the first reducer;

determining partition information of a first physical operator on the first logical relation based on the partition information of the first logical relation;

storing the partition information of the first physical operator in a new data structure, wherein the new data structure stores partition information of the fact table and partition information of each reducer in a predefined sequence;

determining partition information of a second logical relation based on partition information of its child nodes;

determining the partition information of a second physical operator on the second logical relation based on the partition information of the second logical relation and the partition information of the first physical operator;

storing the partition information of the second physical operator in the new data structure; and performing execution of the second physical operator using the partition information stored in the new data structure, wherein the execution skips mappings between pairs of partitions.

16. The non-transitory computer-readable storage medium of claim 15, wherein the new data structure comprises a first variable in format of a vector and a second variable in the format of a list of vectors.

17. The non-transitory computer-readable storage medium of claim 15, wherein storing the partition information of each reducer in the predefined sequence comprises inserting the partition information of each reducer into a list following an order of child reducers of a table scan semi join operator.

18. The non-transitory computer-readable storage medium of claim 15, wherein the partition information is created by a user generating the fact table.

19. The non-transitory computer-readable storage medium of claim 15, wherein the first logical relation is a semi-join operator in relational algebra that selects tuples from one relation that matches tuples in another relation.

20. The non-transitory computer-readable storage medium of claim 15, wherein the second logical relation is a semi-join operator and an ancestor of the first logical relation.

* * * * *